Figure 1:
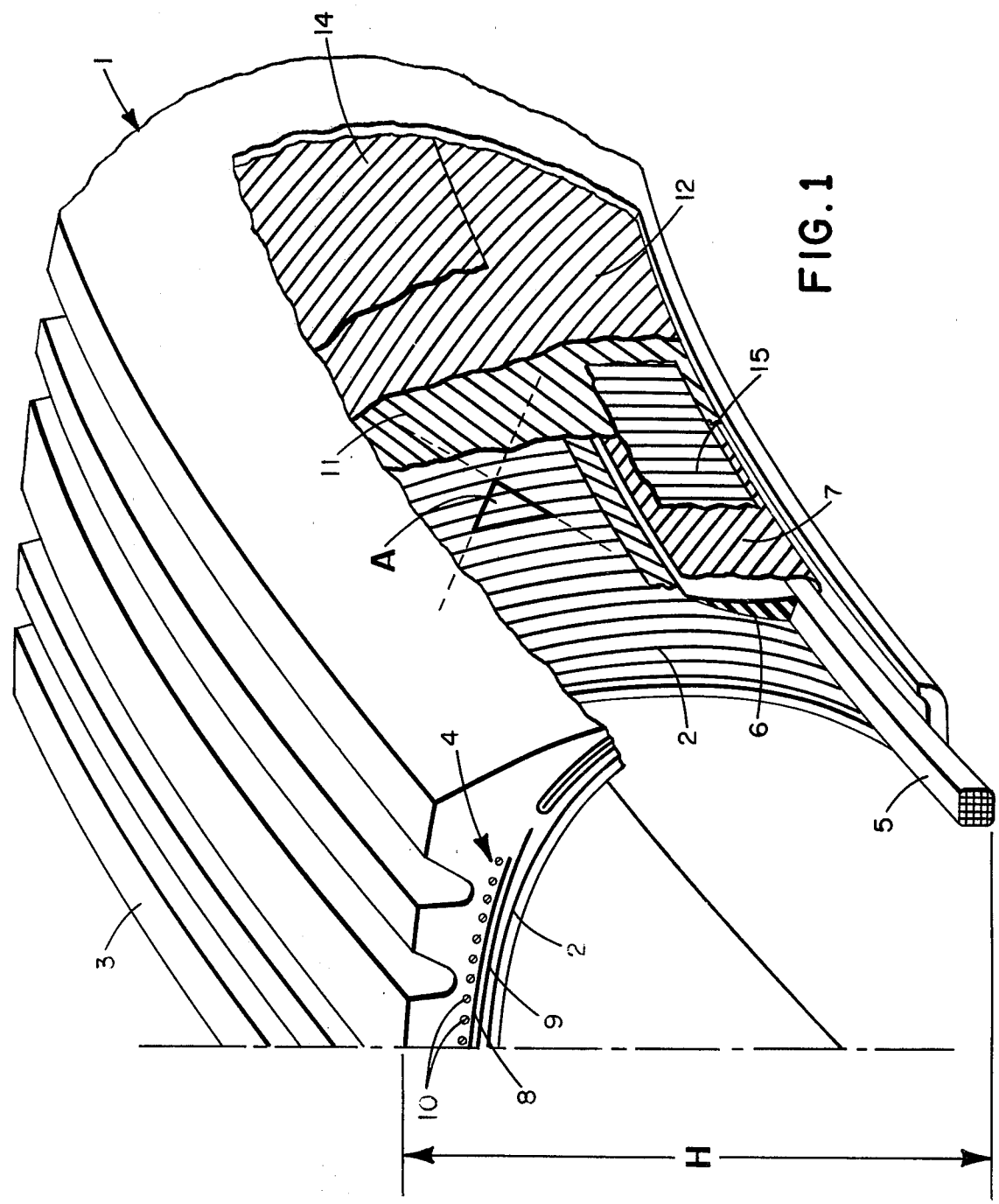

United States Patent [19]

Mezzanotte et al.

[11] 4,357,976

[45] Nov. 9, 1982

[54] RADIAL TIRES COMPRISING REINFORCEMENTS IN THE SIDEWALLS

[75] Inventors: Mario Mezzanotte, Milan; Gianni Turchetti, Bresso, both of Italy

[73] Assignee: Societa' Pneumatici Pirelli S.p.A., Milan, Italy

[21] Appl. No.: 252,865

[22] Filed: Apr. 10, 19813579762310031 52353 R

Related U.S. Application Data

[63] Continuation of Ser. No. 136,352, Apr. 1, 1980, Pat. No. 4,295,511.

Foreign Application Priority Data

[30] Apr. 10, 1979 [IT] Italy ..................................21708/79

[51] Int. Cl.³ ............................................... B60C 5/00
[52] U.S. Cl. .......................... 152/354 RB; 152/353 R; 152/356 R; 152/361 R; 152/362 CS; 152/354 R
[58] Field of Search ........... 152/330 R, 353 R, 354 R, 152/354 RB, 356 R, 359, 361 R, 362 R, 362 CS

[56] References Cited

U.S. PATENT DOCUMENTS

| | | | |
|---|---|---|---|
| 3,480,065 | 11/1969 | Verdier | 152/353 R |
| 3,850,219 | 11/1974 | Snyder | 152/361 DM |
| 4,047,551 | 9/1977 | Mezzanotte | 152/354 RB |
| 4,166,491 | 9/1979 | Mezzanotte | 152/353 R |
| 4,177,852 | 12/1979 | Merli et al. | 152/354 R |
| 4,231,409 | 11/1980 | Mezzanotte | 152/354 R |

Primary Examiner—Edward C. Kimlin
Assistant Examiner—L. Falasco
Attorney, Agent, or Firm—Stevens, Davis, Miller & Mosher

[57] ABSTRACT

A pneumatic tire having a radial carcass comprises two reinforcing layers, of metallic cords, one over the other, in each sidewall. A flipper may be embedded in the upper portion of the sidewall. The flipper is formed by the turned up end of the innermost layer of the sidewall around the second layer of the sidewall reinforcement.

10 Claims, 2 Drawing Figures

RADIAL TIRES COMPRISING REINFORCEMENTS IN THE SIDEWALLS

This application is a continuation-in-part of our application Ser. No. 136,352 filed on Apr. 1, 1980, now U.S. Pat. No. 4,295,511 the disclosure of which is incorporated herein by reference.

This invention relates to radial tires, i.e. to pneumatic tires for motor vehicles having a carcass comprising metallic or textile cords which lie in radial planes and, more particularly, to such pneumatic tires having a radial carcass and reinforced sidewalls.

Pneumatic tires provided with reinforcing elements inserted in the sidewalls are already known. The purpose of the reinforcing elements is to oppose transverse deformation and to avoid, consequently, contact of the sidewalls with the ground under stresses perpendicular to the equatorial plane of the running tire, as, for example, happens at high speeds when the tire is running along a curved trajectory or under the effect of transverse wind thrust on the vehicle.

Generally, these reinforcements comprise in addition to the usual fillers of rubber placed around the bead cores, strips of textile or metallic cords which extend radially from the bead core zone up to about one-half of the height of the tire section. Also, separately or in addition to these strips, one or more strips of cords, inclined with respect to the circumferential lines of the tire and extended from the bead core zone as far as the tire sidewalls extend are often disposed in the tire's sidewalls. For example, a single ply of textile cords folded upon itself in proximity of the tire shoulder with its skirts extended from the folding edge up to in proximity of the bead cores are used to strengthen the tire's sidewalls.

Unfortunately, these known reinforcing cords, although overcoming some of the drawbacks found in the past do not provide sufficient lateral stability of the tire in use, i.e. the proposed reinforcements do not withstand stresses which are transverse to the running direction of the vehicle sufficiently to prevent completely undesirable deformations of the sidewalls.

In fact, the prior art reinforcing structures for sidewalls have been found often to be insufficient at very high speeds and under the effect of high transverse forces. The more obvious methods of increasing the stiffness of the sidewalls to resist deformation as by increasing the number of layers of cords are not at all satisfactory because of the loss of flexibility of the tire and accompanying loss of riding comfort.

The problem of stiffening the sidewalls to avoid substantial deformation under transverse forces without substantial loss of flexibility is made even more difficult by the fact that, in the outermost radial portion of the sidewall reinforcing structure, owing the discontinuity of stiffness between said portion and the sidewall zone comprised between the breaker and said reinforcing structure, there is a tendency for the sidewall reinforcing layers to axially draw away from each other under the stresses and intense heating of said zone as the tire travels over the roadway. This results in a loss of lateral stability.

It is therefore an object of this invention to provide a pneumatic tire having a radial carcass which is devoid of the foregoing disadvantages. Another object of this invention is to provide a pneumatic tire for motor vehicles having sidewalls of increased resistance to deformation under stress transverse to the running direction of the tire. Still another object of the invention is to provide a pneumatic tire for motor vehicles which has a radial carcass and sidewalls which resist substantial deformation of the tire's sidewalls by wind or other transverse forces at high speeds and around curves in the roadway. Still another object of the invention is to provide an improved reinforcing structure for the sidewalls of pneumatic tires having a radial carcass to avoid substantial deformation of the tire by transverse forces at high speeds or while travelling around curves in the roadway.

Figure 2:
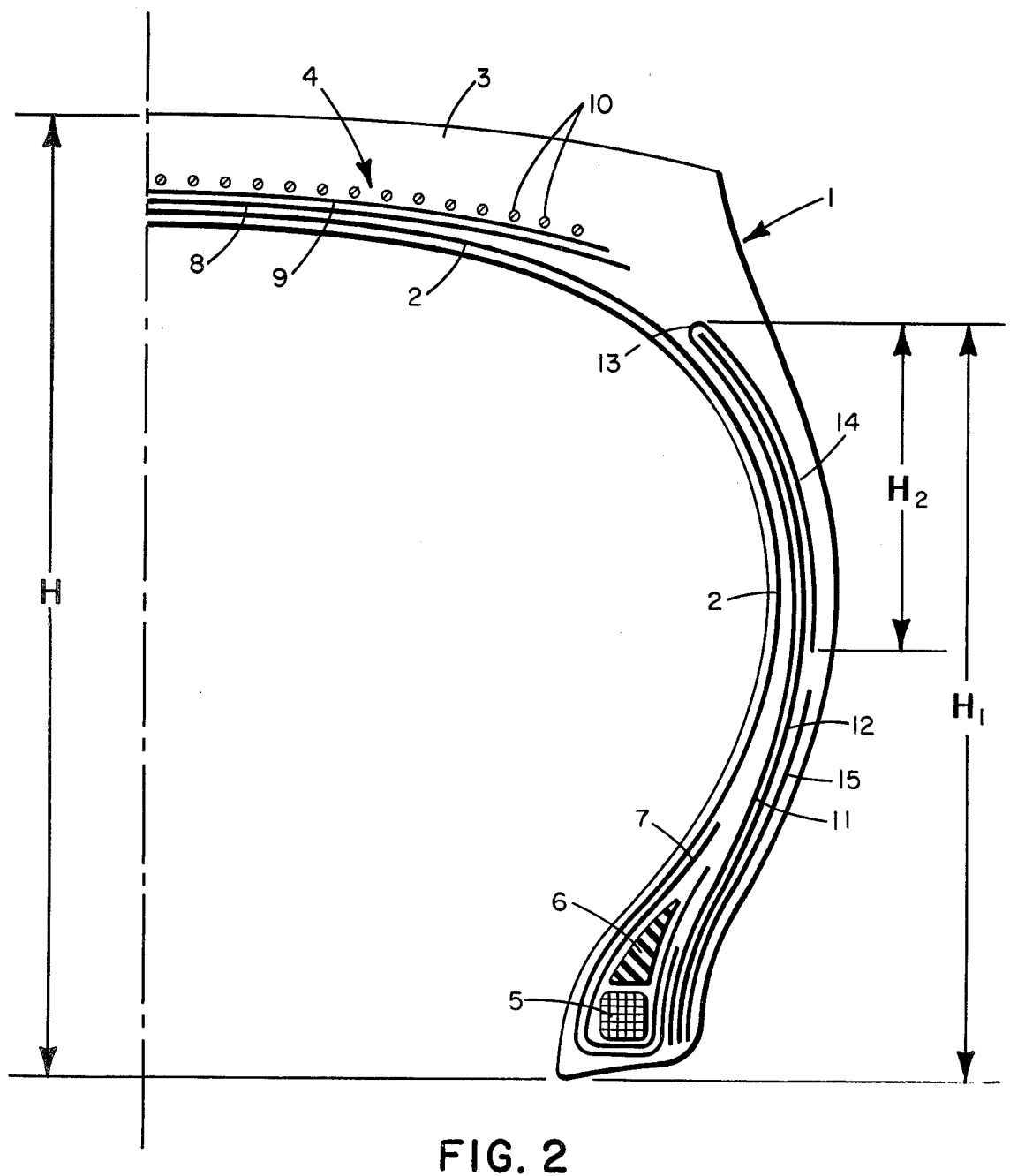

Other objects of the invention will become apparent from the following description with reference to the accompanying drawing wherein FIG. 1 is a perspective view with parts broken away of a segment of one embodiment of the tire provided by the invention; and FIG. 2 is a partial cross-section of the embodiment illustrated in FIG. 1.

As disclosed in our copending application Ser. No. 138,352 filed on Apr. 1, 1980, the performance of a pneumatic tire having a radial carcass is improved by providing a reinforcing structure in the sidewalls of the tire. In accordance with the invention described in our earlier application, each sidewall is provided with a mixed textile-metallic reinforcing structure comprising a strip of textile cords doubled-up over itself in such a way as to present two skirts having different widths, the cords of the skirts being inclined with respect to the radial direction of the carcass cord, and by a strip of metallic cord, also inclined with respect to the radial direction and having a smaller width than that of the larger skirt, inserted between the skirts up to the folded-edge of the textile strip, the larger skirt being disposed axially disposed of the carcass ply and its turn-up, and radially extended from the bead zone to the tire shoulder. The smaller skirt extends radially towards the inside from the shoulder to a point situated in the sidewall at a height between 66% and 20% of the tire's section height. The metallic cord strip extends from the folded-edge of the textile strip, to a point situated at a height between 50% and 20% of the section height of the tire. The sidewall reinforcement improves the transverse rigidity of the tire without substantially reducing the flexibility of the sidewalls.

The objects of the present invention are accomplished, generally speaking, by providing a pneumatic tire for motor vehicles of the general type disclosed in our earlier application and having an improved cord reinforcement for each sidewall which stiffens the sidewall and resists deformation of the sidewall in response to forces transverse of the running direction of the tire by wind or as the vehicle on which the tire is mounted maneuvers a curve in the roadway at a high speed. The reinforcing structure for the sidewall of the tire is formed of at least two layers of metallic cords disposed in the tire sidewall axially outside the portion of the carcass ply which is turned-up around the bead core. The first of the two layers of cords is disposed axially outwardly of the carcass and the second layer is axially outwardly of the first layer of cords. The cords of both of the two layers are metallic and are inclined with respect to the carcass cords. The metallic cords of the first layer cross the metallic cords of the second layer of the sidewall reinforcing structure. The cords forming the first layer are arranged axially outside of the bead turn-up and extend radially from the bead core zone to the shoulder of the tire. The cords forming the first layer are turned upon themselves from the shoulder to a point at height of between 60% and 20% of the total height of the tire section. The second layer of cords of the sidewall reinforcement is axially outwardly from the first layer within the thickness of the sidewall and axially inside of the turn-up of the first layer of cords. The cords forming the second layer extend radially from the tire shoulder toward the bead zone for a length more than 50% of the total height of the tire section.

The present invention thus provides in a preferred embodiment a pneumatic tire having a radial carcass and sidewalls reinforced with two different layers of metallic cords, the cords of the first layer crossing those of the second layer, and a flipper which maintains the two layers together in the upper or radially outer portion of the sidewall, i.e. that portion of the sidewall adjacent to the tread.

It has been found that improved resistance to deformation is provided by sidewall reinforcement cords which consist of metallic cords over a similar reinforcement of mixed metallic and textile cords as contemplated in our earlier application.

The flipper is formed by parts of the first layer of cords of the two sidewall reinforcing layers turned around the upper lip of the second layer in the proximity of the shoulder. The two parts of the first layer which form the flipper are known as the inner and outer skirts.

It has been found that pneumatic tires having the structure provided by this invention have improved lateral stability over tires of the prior art having a radial carcass with know reinforcing cords in the sidewalls.

Because various phenomenon occur in the sidewall of a tire as it is used, the applicants cannot explain accurately the way in which their invention improves the lateral stability of a tire but they submit the following as a possible explanation without being bound to the explanation or any theory of how the invention improves the tire.

In prior art tires, for example, which have at least one layer of textile cords inserted in the sidewall, because of the different deformations which occur in the two sidewalls of the same tire as it runs along a curved trajectory, the cords of the reinforcing layer of the inner sidewall with respect to the curve, are subjected to traction and withstand the stresses, while the cords in the reinforcing layer of the outer sidewall, with respect to the curve, under the weight on the tire and the transverse thrust, are compressed and since they are textile cords of poor compression resistance, they are not sufficiently stiff to resist the lateral thrusts.

Assuming that this explanation is valid, i.e. that the two sidewalls deform differently when the tire runs along a curved trajectory, this negative situation is not present in the tire provided by the invention, since the metallic cords of the two layers inserted in each sidewall have a resistance to compression and to traction in both the two crossing directions and produce consequently a suitable lateral stiffness in the sidewall.

Moreover, the improved lateral stability of the present tire with respect to those known, is noted in particular in the upper portion of the sidewall where, at high speeds, there is no separation between the ends of the two adjacent layers.

In this connection, the outer skirt of the first layer of the tire, folded upon the abutting line constituted by the lip of the second layer and embedded in the elastomeric material of the sidewall expanded under tire inflation pressure, is able to exert in the running of the tire a traction action or a recalling action on the second layer forcing it to remain in tight contact with the innermost skirt.

Referring now to the drawing, tire 1 has a radial carcass 2, a tread 3 and a reinforcing annular structure (breaker) 4 inserted between the carcass and tread. As shown in FIG. 1, the metallic or textile cords of carcass 2 are arranged in radial planes, the cords extend from one bead to the other, and are turned-up in each bead from the inside towards the outside of the tire around the bead cores 5 on which the rubber fillers 6 having a hardness of 70° to 90° Shore A are applied. The bead core-filler assembly is wrapped with a flipper formed by the ply 7 of heat shrinkable nylon cords inclined at 35° with respect to the circumferential lines of the tire.

The reinforcing annular structure 4 comprises a layer 8 of metallic cords, parallel and inclined at 20° with respect to the equatorial plane, a second layer 9 of metallic cords parallel and inclined with respect to the equatorial plane symmetrically with the underlying cords, of layer 8, and a third layer 10 of cords directed parallel to the equatorial plane, formed by a textile material which is heat shrinkable, i.e. nylon.

A reinforcing structure is inserted in each sidewall, with each structure comprising, starting from the carcass inside towards the outside, at least two layers 11, 12 consisting of metallic cords parallel to each other in each layer and crossed with respect to those of the adjacent layer.

The first layer 11 is applied in an axially outer position with respect to the bead turn-up 16 and extends radially from adjacent to bead core 5 to the tire shoulder and is folded-up in this zone on the lip 13 of the second adjacent layer 12 to extend radially towards the bead core 5.

The second layer 12 comprises an upper part between two skirts of the layer 11 with its own upper lip 13 opposite to the inner folded edge of the first layer 11, the second layer extending radially toward the inside for a predetermined height $H_1$ (FIG. 2) of the tire section height H. $H_1$ is at least more than 50% of height H.

In the preferred embodiment as shown in FIG. 1, the second layer 12 extends radially from the bead zone to under the inner folded edge of the first layer 11.

The outermost skirt 14 of the first layer 11 extends to a point situated at a height $H_2$ (FIG. 2) between 20% and 60% of the tire section, and preferably at a height corresponding to 50% of the tire section height H.

The cords of the two layers 11 and 12 can form with the radial cords of the carcass ply angles comprised between 20° and 50°, preferably of 45°.

Further, it has been found advantageous to use lang lay cords having the formation 3×3×0.12 i.e., three strands, each strand having three wires of 0.12 mm in diameter.

The reinforcing structure inserted in the sidewall can be completed in the lower portion by a layer 15 of metallic cords arranged in an axially outer position with respect to the second layer 12 and extending preferably up to one-half of the height of the tire section. ($H_3$ in FIG. 2).

The metallic cords of layer 15 have the formation 4×3×0.22 and are of the High Elongation kind. The cords of layer 15 are directed in the same plane as the carcass radial cords.

The tire described and illustrated in the drawing has demonstrated high lateral stiffness because the metallic cords of the two layers inserted in each sidewall, with the carcass radial cords originate on its whole a plurality of triangles (see A, in FIG. 1), and are therefore, per se very firm resistant structures.

The upper portion of the sidewall is also stiff thanks to the action of the flipper of the invention, which maintains the two reinforcing layers 11 and 12 together even at high speeds of up to 250 km/hour or higher.

Although the invention has been described in detail for the purpose of illustration, it is to be understood that such detail is solely for that purpose and that variations can be made therein by those skilled in the art without departing from the spirit and scope of the invention except as it may be limited by the claims. For example, although a metallic radial carcass is preferred, a radial carcass of textile cords may be used and the cords of the breaker structure may be disposed at an angle of 15° to 35° with the equatorial plane of the tire but 20° is preferred: moreover the metallic cords of the layers 11 and 12 can be of any diameter between 0.12 and 0.25 mm.

What is claimed is:

1. A pneumatic tire for motor vehicles comprising two sidewalls, a crown portion having shoulders which are integral with the sidewalls, an annular bead core in each sidewall for securing the tire to a tire rim, a carcass having cords disposed substantially in radial planes and having opposite ends turned up about said bead cores, a tread on said crown, an annular reinforcing structure disposed between the tread and carcass, each of said sidewalls comprising at least two layers consisting essentially of metal cords, a first of said layers being disposed in the sidewalls axially outside of the carcass and a second of said layers disposed axially outside of the said first layer in the sidewall, said cords in each of said layers being inclined at an angle with respect to the direction of the carcass cords, the cords of one of said layers crossing the cords of the other of said layers, said first layer of cords being arranged axially outside the said turned-up ends of the carcass cords and extending through the sidewall to the said shoulder, said first layer having its end turned-up with an overlay of from the said shoulder to a point that is from 20% to 60% of the height of the tire section, said second layer being positioned axially outside of the first layer in the sidewall and axially inside of the turned-up portion of the first layer in said shoulder and extending radially from the shoulder toward the bead core for a height which is more than 50% of the tire section height.

2. The pneumatic tire of claim 1 wherein said second layer extends radially from adjacent to the bead core to the tire shoulder.

3. The pneumatic tire of claim 1 or 2 wherein the cords of both the said first and second layers are inclined at 20° to 50° with the direction of the carcass cords.

4. The pneumatic tire of claim 3 wherein said cords of said layers are inclined at 45° with the direction of the carcass cords.

5. The pneumatic tire of claim 1, 2 or 4 wherein the cords of each of said layers are lang lay cords.

6. The pneumatic tire of claim 5 wherein the cords of each of said layers of cords are $3 \times 3 \times 0.12$.

7. The pneumatic tire of claim 5 wherein a third layer of metallic cords is arranged in the lower portion of each of said sidewalls in an axially outer position to said second layer of cords the cords of said third layer lying in planes parallel to the planes in which the carcass cords are disposed.

8. The pneumatic tire of claim 7 wherein the cords of said third layer are of High Elongation type.

9. A pneumatic tire for motor vehicle wheel having an annular carcass comprising substantially parallel radial extending cords, and having radially spaced carcass edges, a crown integral with both sidewalls and spanning the space between the said edges, annular beads comprising bead cores disposed adjacent to said edges of the sidewalls, a tread on said crown's external surface, and a shoulder joining the crown to each sidewall, an annular reinforcing member for the tread disposed in said crown between the tread and carcass and extending from adjacent to a first shoulder across the crown to adjacent to a second shoulder, said annular reinforcing member comprising a first layer of metallic cords parallel to each other and disposed at an angle of 15°-35° with the equatorial plane of the tire, a second layer of metallic cords parallel to each other disposed radially out from the said first layer and symmetrically inclined with the cords of said first layer, and a third layer radially outside the said second layer and comprisng heat shrinkable textile cords parallel to each other and to the equatorial plane of the tire, and means for stiffening each of said sidewalls to resist deformation by lateral forces comprising first and second layers of metallic cords disposed in each sidewall between said bead core and said shoulder, said first layer being axially inside of said second layer, said second layer of sidewall reinforcement cords extending radially outwardly from adjacent the bead core to the shoulder, said first layer being wound over the edge of the second layer in the shoulder and overlapping itself a distance of 20-60% of the total section height of the tire, and a layer of heat shrinkable textile cords wrapped around the bead core axially inside said first layer of sidewall reinforcing cords forming a flipper structure in the sidewall adjacent to the bead core.

10. The pneumatic tire of claim 9 wherein the carcass comprises textile cords.

* * * * *